(12) United States Patent
Chen et al.

(10) Patent No.: US 11,243,344 B2
(45) Date of Patent: *Feb. 8, 2022

(54) LIGHT SOURCE STRUCTURE, BACKLIGHT MODULE AND DISPLAY DEVICE

(71) Applicants: Radiant Opto-Electronics (Suzhou) Co.,Ltd., Jiangsu (CN); Radiant Opto-Electronics Corporation, Kaohsiung (TW)

(72) Inventors: Jui-Lin Chen, Kaohsiung (TW); Pin-Hsun Lee, Kaohsiung (TW); Yen-Ping Cheng, Kaohsiung (TW); Yuan-Jhang Chen, Kaohsiung (TW); Ruei-Lin Huang, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/192,907

(22) Filed: Mar. 5, 2021

(65) Prior Publication Data

US 2021/0191032 A1 Jun. 24, 2021

Related U.S. Application Data

(63) Continuation of application No. 17/033,961, filed on Sep. 28, 2020, now Pat. No. 11,009,651, which is a continuation of application No. PCT/CN2019/106658, filed on Sep. 19, 2019.

(51) Int. Cl.
*F21V 8/00* (2006.01)

(52) U.S. Cl.
CPC .......... *G02B 6/0068* (2013.01); *G02B 6/0073* (2013.01)

(58) Field of Classification Search
CPC ........................... G02B 6/0068; G02B 6/0073
See application file for complete search history.

(56) References Cited

U.S. PATENT DOCUMENTS 11,009,651 B2 * 5/2021 Chen .................... G02B 6/0068

* cited by examiner

*Primary Examiner* — Mary Ellen Bowman
(74) *Attorney, Agent, or Firm* — CKC & Partners Co., LLC

(57) ABSTRACT

A light source structure, a backlight module and a display are provided. The light source structure includes a substrate and plural light source groups. The light source groups are arranged on the substrate, in which each of the light source groups includes plural light-emitting units, and there is a first distance between any two adjacent light-emitting units in each of the light source groups, and there is a second distance between two closest light-emitting units that are respectively in any two adjacent light source groups. The second distance is smaller than the first distance.

8 Claims, 6 Drawing Sheets

LIGHT SOURCE STRUCTURE, BACKLIGHT MODULE AND DISPLAY DEVICE

RELATED APPLICATIONS

This application is a continuation application of U.S. application Ser. No. 17/033,961 filed on Sep. 28, 2020, which is a continuation application of International Application No. PCT/CN2019/106658 filed on Sep. 19, 2019. The entire disclosures of all the above applications are hereby incorporated by reference herein.

BACKGROUND

Field of Invention

The present invention relates to a light source element. More particularly, the present invention relates to a light source structure, a backlight module and a display device.

Description of Related Art

Referring to FIG. 1, FIG. 1 is a schematic structural diagram showing a conventional light source structure 100. The conventional light source structure 100 which is used for a direct type backlight module mainly includes a substrate 110 and plural light-emitting diodes 120 arrayed on the substrate 110 at equal intervals. Light that is generated from the light-emitting diodes 120 and passes through an optical film is mixed to form a surface light source.

However, referring to FIG. 2, FIG. 2 is a diagram showing a brightness simulation of the conventional light source structure. As shown in FIG. 2, because the light-emitting diodes 120 are arranged in an equally spaced array, a dark band with a width W1 (dark region) and a dark band with a width W2 (dark region) are likely to be formed between adjacent light-emitting diodes, thus causing the appearance of the backlight module to have obvious contrast of bright and dark regions and un-uniform brightness.

SUMMARY

An object of the present disclosure is to provide a light source structure, a backlight module and a display device for enabling the light source structure to generate light with uniform brightness so as to improve the optical appearance of the backlight module and the display device.

According to the aforementioned object, a light source structure is provided. The light source structure includes a substrate and plural light source groups. The light source groups are arranged on the substrate, in which each of the light source groups includes plural light-emitting units, and there is a first distance between any two adjacent light-emitting units in each of the light source groups, and there is a second distance between two closest light-emitting units that are respectively in any two adjacent light source groups. The second distance is smaller than the first distance.

According to an embodiment of the present invention, the light source groups are arranged at equal intervals, and the first distance is smaller than half of a pitch between any two adjacent light source groups.

According to an embodiment of the present invention, the light-emitting units in each of the light source groups are arranged in a square.

According to an embodiment of the present invention, the light-emitting units in each of the light source groups are arranged along a circular track to form a regular polygon.

According to an embodiment of the present invention, a relationship between a radius of the circular track and a pitch between adjacent light source groups is $3.5*A3 \geq S1 > 2*A3$, wherein A3 stands for the radius of the circular track, and S1 stands for the pitch between the adjacent light source groups.

According to an embodiment of the present invention, the substrate has a first side edge which extends along a first direction and a second side edge which extends along a second direction, wherein the first side edge is vertical to the second side edge. The light source groups are arrayed along the first direction and the second direction.

According to an embodiment of the present invention, a connecting line between any two adjacent light-emitting units in each light source group is not parallel to the first side edge or the second side edge.

According to an embodiment of the present invention, the light-emitting units in each of the light source groups are arranged along a circular track to form a regular polygon, wherein the regular polygon has a number of sides, and the circular track has a center. There is a first connecting line between the centers of any two adjacent circular tracks, and there is a second connecting line between any one of the light-emitting units in each of the light source groups and the center of the circular track corresponding to the each of the light source groups, wherein an included angle between the second connecting line and the first connecting line is not equal to a number that is 180 degrees divided by the number of the sides of the regular polygon.

According to the aforementioned object, a backlight module is provided. The backlight module includes aforementioned light source structure and at least one optical film. The optical film is disposed on the light source structure.

According to the aforementioned object, a display device is provided. The display device includes aforementioned backlight module and a display panel. The display panel is disposed in front of the backlight module.

It can be seen from the abovementioned embodiments of the present disclosure, the present disclosure changes the design rules of the conventional light source structure. Each light source group consists of several light-emitting units, and several light source groups are arranged on the substrate, so that a distance between two closest ones of the light-emitting units of any two adjacent light source groups is smaller than a distance between any two adjacent light-emitting units of each of the light source groups, thereby reducing the width of the dark band generated on a light-emitting surface of the light source structure and increasing the uniformity of the backlight module.

BRIEF DESCRIPTION OF THE DRAWINGS

The invention can be more fully understood by reading the following detailed description of the embodiment, with reference made to the accompanying drawings as follows.

DETAILED DESCRIPTION

Figure 3:
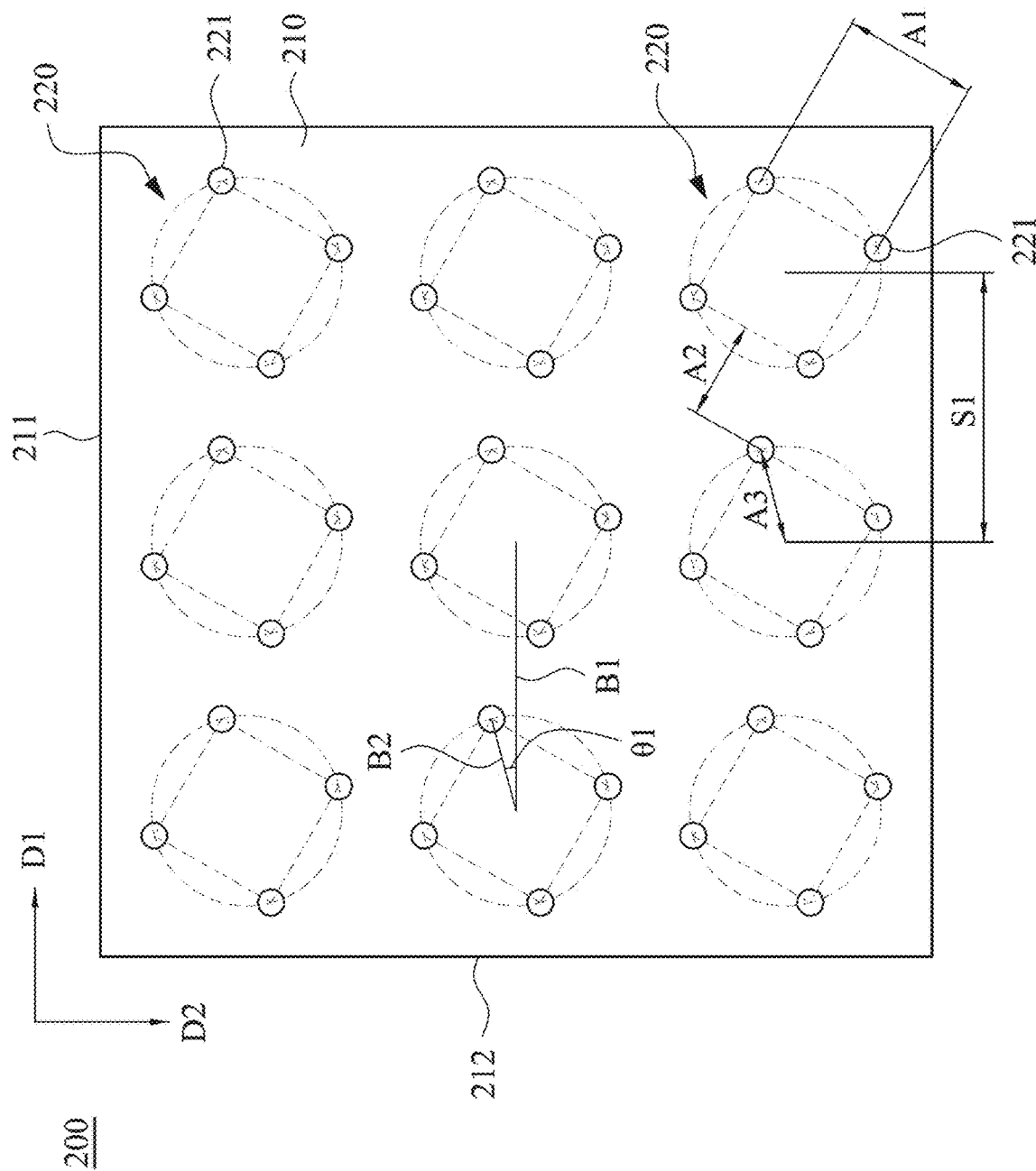
FIG. 3 is a schematic diagram showing a light source structure in accordance with a first embodiment of the present disclosure.

Referring to FIG. 3, FIG. 3 is a schematic diagram showing a light source structure 200 in accordance with a first embodiment of the present disclosure. In the present embodiment, the light source structure 200 mainly includes a substrate 210 and plural light source groups 220. The substrate 210 has a first side edge 211 and a second side edge 212 which is vertical to the first side edge 211. The first side edge 211 extends along a first direction D1, and the second side edge 212 extends along a second direction D2, in which the first direction D1 is vertical to the second direction D2. As shown in FIG. 3, in the present embodiment, the light source groups 220 are arrayed along the first direction D1 and the second direction D2. In one embodiment, the light source groups 220 are arranged on the substrate 210 at equal intervals, and there is a pitch S1 between any two adjacent light source groups 220.

As shown in FIG. 3, in the present embodiment, each of the light source groups 220 includes plural light-emitting units 221, and the light-emitting units 221 of each of the light source groups 220 are arranged along a circular track to form a regular polygon. In each light source group 220, connecting lines between any two adjacent light-emitting units 221 are not parallel to the first side edge 211 or the second side edge 212. In the embodiment of FIG. 3, the light-emitting units 221 in each of the light source groups 220 are arranged in a square, and any of sides of the square is not parallel to the first side edge 211 and also not parallel to the second side edge 212. More specifically, it is preferable that the arrangement directions of the light-emitting units 221 are as much as possible not parallel to edges (i.e. the first side edge 211 or the second side edge 212) of a displayer. In this manner, users may be less likely to be aware of bright bands caused by the regularly arranged light sources. In one embodiment, in each light source group 220, there is a first distance A1 between any two adjacent light-emitting units 221 which are arranged along the circular track. A distance between centers (centers of the circular tracks) of any two adjacent light source groups 220 can be defined as a pitch S1. A distance between two closest light-emitting units 221 that are respectively in any two adjacent light source groups 220 can be defined as a second distance A2. In the present embodiment, the second distance A2 is designed to be smaller than the first distance A1. By this design, the light source structure 200 can generate better light uniformity effect. In some embodiments, the first distance A1 should be less than half of the pitch S1 between any two adjacent light source groups 220.

Figure 1:
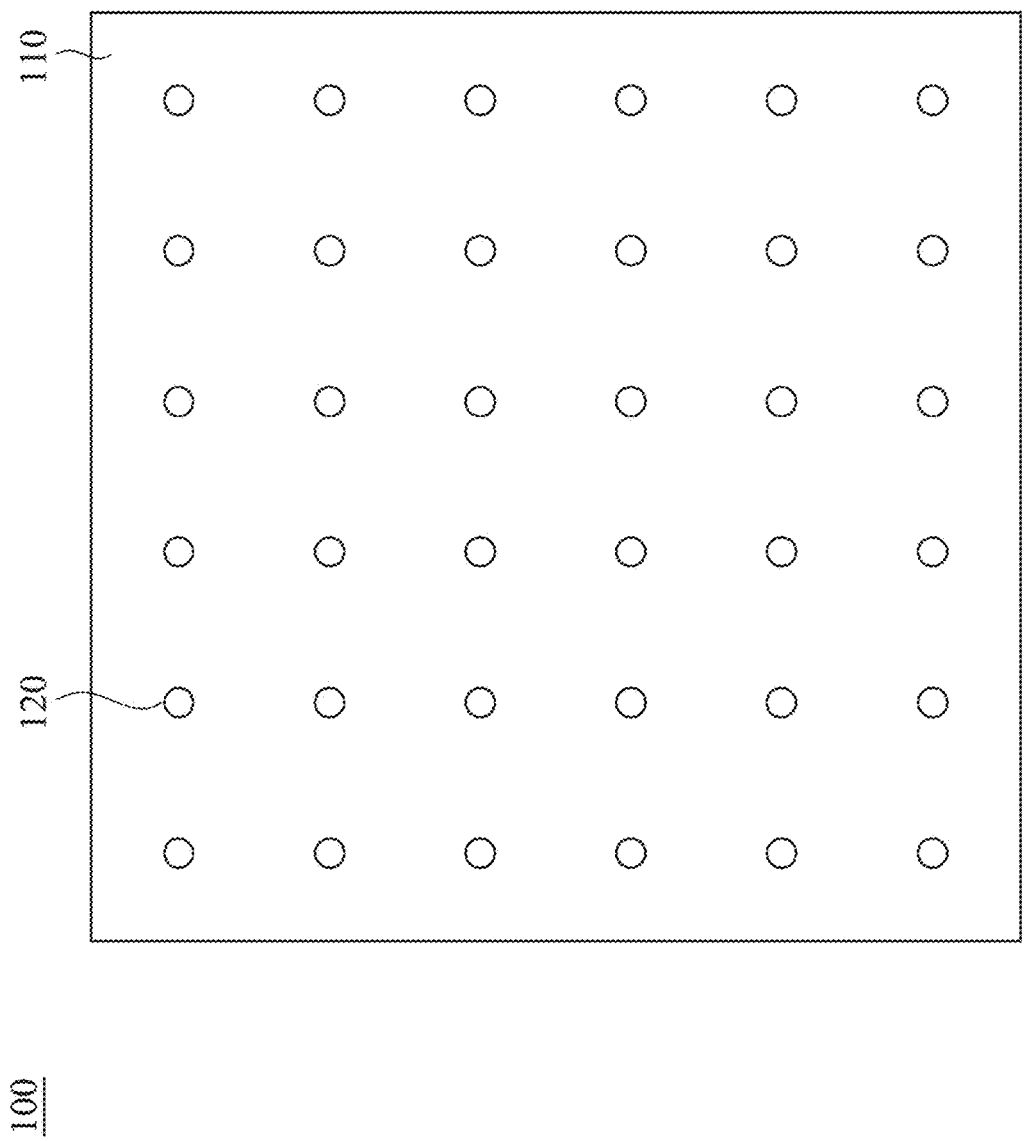
FIG. 1 is a schematic structural diagram showing a conventional light source structure.
Figure 2:
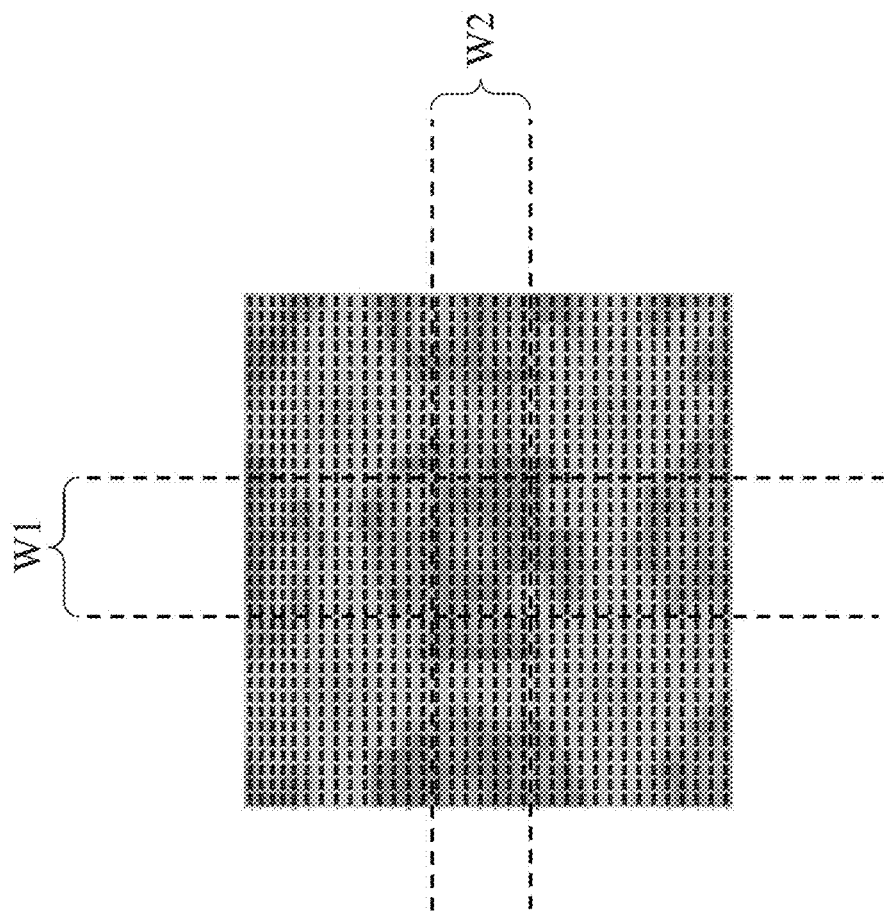
FIG. 2 is a diagram showing a brightness simulation of the conventional light source structure.
Figure 4:
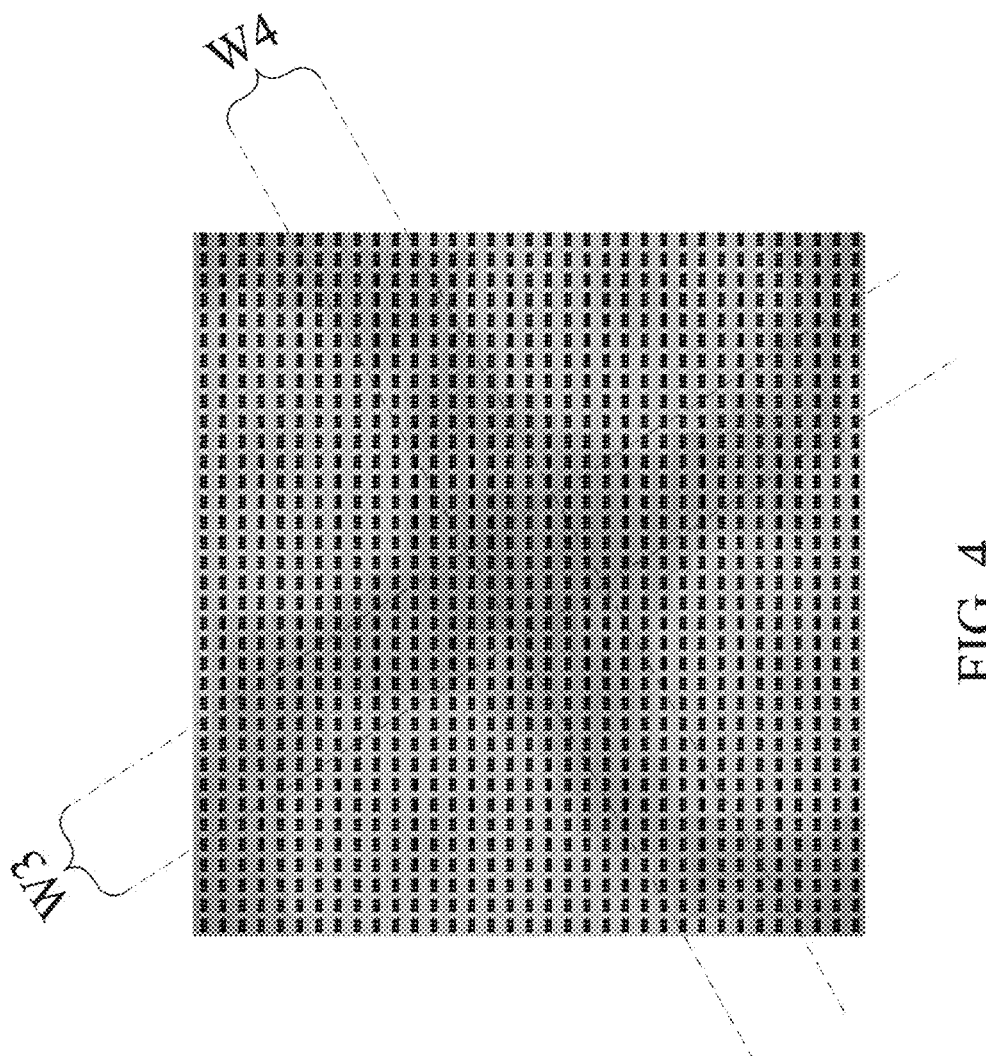
FIG. 4 is a diagram showing a brightness simulation of the light source structure of the first embodiment of the present disclosure.

Simultaneously referring to FIG. 3 and FIG. 4, FIG. 4 is a diagram showing a brightness simulation of the light source structure of the first embodiment of the present disclosure. From FIG. 4, it can be seen that, compared to the conventional light source structure 100 of FIG. 1, by rotating the regular polygon which is formed by the arrangement of the light-emitting units 221 along a circular track in an angle, the distance (for example, second distance A2) between two closest ones of the light-emitting units 221 of any two adjacent light source groups 220 can be reduced along the first direction D1 and/or second direction D2, such that the second distance A2 can be smaller than the first distance A1 between any two adjacent light-emitting units 221 in each light source group 220, thereby reducing a width W3 and a width W4 of the dark band generated by the light source structure 200 in FIG. 3. In other words, an area of the dark region in FIG. 4 is significantly smaller than an area of the dark region in FIG. 2, and the color contrast between light and dark colors of FIG. 4 is smaller than the color contrast between light and dark colors of FIG. 2, which means that the light emission luminance in FIG. 4 is more uniform. Therefore, when the light source structure 200 of the present embodiment is applied to a backlight module to be collocated with an optical film, the overall appearance generated by the backlight module is more uniform.

It is noted that, in each of the light source groups 220, although the light-emitting units 221 are arranged along the circular track to form the regular polygon, and any one of side edges of this regular polygon is not parallel to the first side edge 211 or the second side edge 212 of the substrate 210. In one embodiment, as shown in FIG. 3, there is a first connecting line B1 the centers of any two adjacent circular tracks, and there is a second connecting line B2 between any of the light-emitting units 221 in each light source group 220 and the center of its corresponding circular track. An included angle θ1 between the first connecting line B1 and the second connecting line B2 is not equal to a number that is 180 degrees divided by the number of the sides of the regular polygon. For example, as shown in FIG. 3, the light-emitting units 221 are arranged in a square along a circular track, such that the included angle θ1 is not equal to 180 degrees divided by 4 (that is, 45 degrees), so as to prevent light-emitting units 221 in each of the light source groups from being arranged in the conventional rectangular array. Therefore, in each of the light source groups 220, when the number of sides of the regular polygon in the circular track along which the light-emitting units 221 are arranged is determined, the included angle θ1 can be determined according to the requirements of the user.

It is noted that, take the light source groups 220 arranged in a quadrilateral as an example, in order to prevent the light-emitting units 221 from overlapping, there is a third distance A3 (i.e., the radius of the circular track) between any of the light-emitting units 221 in each light source group 220 and the center of its corresponding circular track, and the pitch S1 between any two adjacent light source groups 220 must exceed twice of the third distance A3. Moreover, in order to avoid a large dark band formed between adjacent light source groups 220, the pitch S1 between any two adjacent light source groups 220 cannot be greater than 3.5 times the length of the third distance A3. In other words, a relationship between the radius of the circular track (i.e., third distance A3) in each light source group 220 and a pitch S1 between the adjacent light source groups 220 can be expressed by: $3.5*A3 \geq S1 > 2*A3$. Therefore, when the light source structure 200 of the present embodiment is applied to a backlight module to be collocated with an optical film, the overall appearance generated by the backlight module is more uniform.

Figure 5:
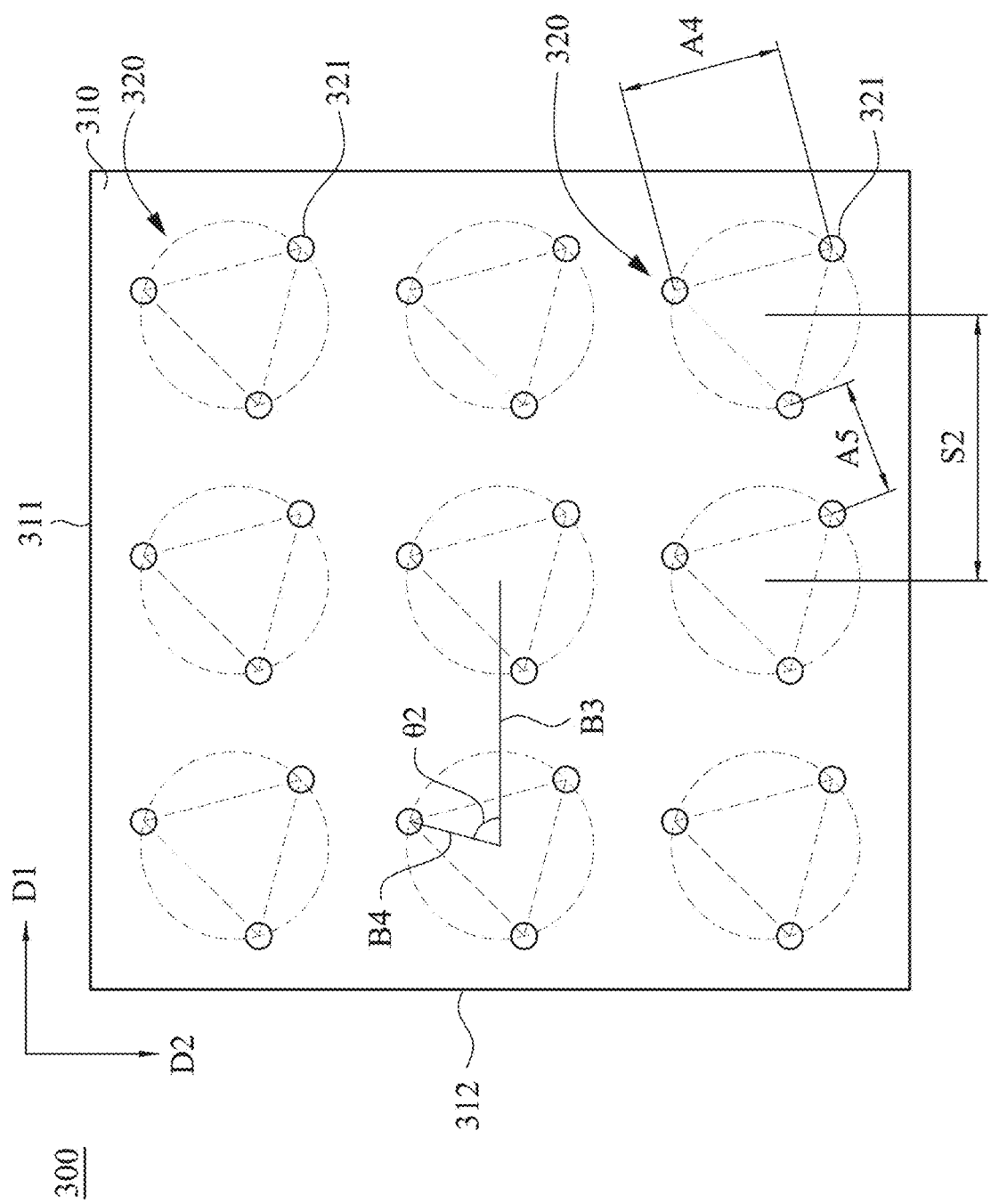
FIG. 5 is a schematic diagram showing a light source structure in accordance with a second embodiment of the present disclosure.

It is noted that, the light-emitting units 221 in each light source group 220 which are arranged in square along a circular track are merely used as an example for explanation, and embodiments of the present disclosure are not limited thereto. In other embodiments, the light-emitting units of each of the light source groups can be arranged in different shapes. Referring to FIG. 5, FIG. 5 is a schematic diagram showing a light source structure 300 in accordance with a second embodiment of the present disclosure. The light source structure 300 as shown in FIG. 5 includes a substrate 310 and plural light source groups 320. The substrate 310 has a first side edge 311 and a second side edge 312. The first side edge 311 extends along the first direction D1, and the second side edge 312 extends along the second direction D2, in which the first direction D1 is vertical to the second direction D2. In the present embodiment, the light source groups 320 are arranged on the substrate 310 at equal intervals, and there is a pitch S2 between any two adjacent light source groups 320.

As shown in FIG. 5, in one embodiment, each of the light source groups 320 includes plural light-emitting units 321. In the embodiment of FIG. 5, the light-emitting units 321 in each light source group 320 are arranged in an equilateral triangle shape along a circular track. In one embodiment, in each light source group 320, there is a first distance A4 between any two adjacent light-emitting units 321 which are arranged along the circular track. In addition, a distance between two closest ones of the light-emitting units 321 of any two adjacent light source groups 320 can be defined as a second distance A5. In the present embodiment, the second distance A5 is designed to be smaller than the first distance A4. By this design, dark bands between adjacent light source groups 320 can be reduced, thereby achieving better light uniformity effect.

Similarly, in the each of the light source groups 320, although the light-emitting units 321 are arranged along the circular track to form the equilateral triangle shape, and any one of side edges of this equilateral triangle shape is not parallel to the first side edge 311 or the second side edge 312 of the substrate 310. In the embodiment of FIG. 5, there is a first connecting line B3 between the centers of any two adjacent circular tracks, and there is a second connecting line B4 between any one of the light-emitting units 321 in each light source group 320 and the center of the corresponding circular track. An included angle θ2 between the first connecting line B3 and the second connecting line B4 is not equal to a number that is 180 degrees divided by the number of the sides of equilateral triangle shape (that is, 60 degrees). Therefore, in each of the light source groups 320, when the number of sides of the regular polygon in the circular track along which the light-emitting units 321 are arranged is determined, the included angle θ2 can be determined according to the requirements of the user.

It is noted that, although the aforementioned embodiments take the light-emitting units arranged in a square and an equilateral triangle as examples, this is not intended to limit the disclosure. In other embodiments, the light-emitting units can also be arranged in other regular polygons, such as regular pentagons, regular hexagons, regular heptagons, etc.

Figure 6:
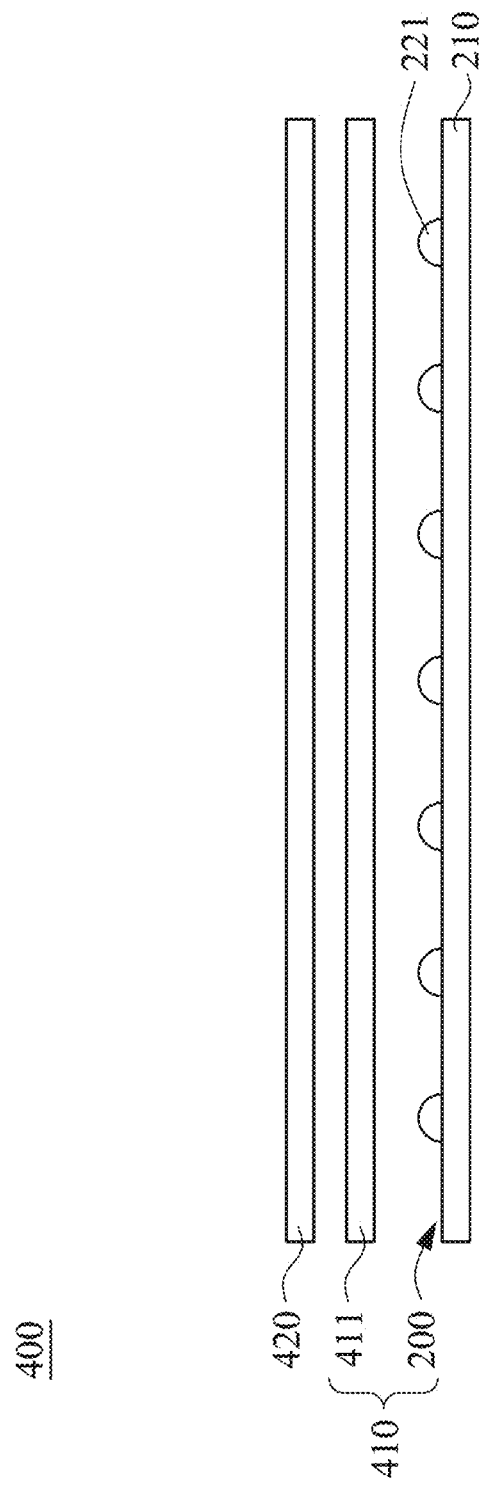
FIG. 6 is a schematic diagram showing a display device in accordance with an embodiment of the present disclosure.

Referring to FIG. 6, FIG. 6 is a schematic diagram showing a display device 400 in accordance with an embodiment of the present disclosure. The display device 400 of the present embodiment includes a backlight module 410 and a display panel 420. The backlight module 410 includes the source structure 200 shown in FIG. 3 and at least one optical film 411 disposed above the light source structure 200. As shown in FIG. 6, the display panel 420 is disposed in front of the backlight module 410, so that after passing through the optical film 411, light generated by the light source structure 200 can enter the display panel 420 and emits from the display panel 420. It is noted that, the light source structure 200 shown in FIG. 3 is merely used as an example applied to the display device for explanation, and embodiments of the present invention are not limited thereto. In other embodiments, other light source structures, such as the light source structure 300 in FIG. 5 also can be applied to the display device, so as to achieve the same effect.

It can be seen from the abovementioned embodiments of the present disclosure, the present disclosure changes the design rules of the conventional light source structure. Each light source group consists of several light-emitting units, and several light source groups are arranged on the substrate, so that a distance between two closest ones of the light-emitting units of any two adjacent light source groups is smaller than a distance between any two adjacent light-emitting units of each of the light source groups, thereby reducing the width of the dark band generated on a light-emitting surface of the light source structure and increasing the uniformity of the backlight module.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light source structure, comprising:
   a substrate having a first side edge which extends along a first direction and a second side edge which extends along a second direction, wherein the first side edge is vertical to the second side edge; and
   a plurality of light source groups arranged on the substrate, wherein the light source groups are arrayed along the first direction and the second direction, and each of the light source groups comprises a plurality of light-emitting units, and there is a first distance between any two adjacent light-emitting units in each of the light source groups, and there is a second distance between two closest light-emitting units that are respectively in any two adjacent light source groups;
   wherein the second distance is smaller than the first distance;
   wherein a connecting line between any two adjacent light-emitting units in each light source group is not parallel to the first side edge or the second side edge.

2. The light source structure of claim 1, wherein the light source groups are arranged at equal intervals, and the first distance is smaller than half of a pitch between any two adjacent light source groups.

3. The light source structure of claim 2, wherein the light-emitting units in each of the light source groups are arranged in a square.

4. The light source structure of claim 1, wherein the light-emitting units in each of the light source groups are arranged along a circular track to form a regular polygon.

5. The light source structure of claim 4, wherein a relationship between a radius of the circular track and a pitch between adjacent light source groups is 3.5*A3≥S1>2*A3, wherein A3 stands for the radius of the circular track, and S1 stands for the pitch between the adjacent light source groups.

6. The light source structure of claim 1, wherein
   the light-emitting units in each of the light source groups are arranged along a circular track to form a regular polygon, wherein the regular polygon has a number of sides, and the circular track has a center; and
   there is a first connecting line between the centers of any two adjacent circular tracks, and there is a second connecting line between any one of the light-emitting units in each of the light source groups and the center of the circular track corresponding to the each of the light source groups, wherein an included angle between the second connecting line and the first connecting line is not equal to a number that is 180 degrees divided by the number of the sides of the regular polygon.

7. A backlight module, comprising:

a light source structure of claim 1; and at least one optical film disposed on the light source structure.

8. A display device, comprising:

a backlight module of claim 7; and a display panel disposed in front of the backlight module.

\* \* \* \* \*